US011755496B1

(12) United States Patent
Barry et al.

(10) Patent No.: US 11,755,496 B1
(45) Date of Patent: Sep. 12, 2023

(54) MEMORY DE-DUPLICATION USING PHYSICAL MEMORY ALIASES

(71) Applicant: Amazon Technologies, Inc., Seattle, WA (US)

(72) Inventors: Peter Barry, Limerick (IE); Adi Habusha, Alonei Abba (IL); Martin Pohlack, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/547,888

(22) Filed: Dec. 10, 2021

(51) Int. Cl.
| G06F 12/1009 | (2016.01) |
| G06F 12/0882 | (2016.01) |
| G06F 12/06 | (2006.01) |
| G06F 12/02 | (2006.01) |

(52) U.S. Cl.
CPC ...... *G06F 12/1009* (2013.01); *G06F 12/0238* (2013.01); *G06F 12/0646* (2013.01); *G06F 12/0882* (2013.01); *G06F 2212/7201* (2013.01)

(58) Field of Classification Search
CPC ............. G06F 12/0238; G06F 12/1009; G06F 12/0882; G06F 2212/7201
See application file for complete search history.

(56) References Cited

U.S. PATENT DOCUMENTS

| 5,923,847 A * | 7/1999 | Hagersten | G06F 15/173 709/215 |
| 6,877,063 B1 * | 4/2005 | Allegrucci | G06F 12/0638 711/E12.083 |
| 9,009,385 B1 | 4/2015 | Juels | |

(Continued)

FOREIGN PATENT DOCUMENTS

| CA | 1283220 | 4/1991 |
| CN | 112596802 A | 4/2021 |
| WO | 2009057094 A1 | 5/2009 |

OTHER PUBLICATIONS

U.S. Appl. No. 17/084,336, filed Oct. 29, 2020, Martin Pohlack, et al.

(Continued)

*Primary Examiner* — Aracelis Ruiz
(74) *Attorney, Agent, or Firm* — S. Scott Foster; Kowert, Hood, Munyon, Rankin & Goetzel, P.C.

(57) ABSTRACT

A computer system and methods are disclosed for mitigating side-channel attacks using memory aliasing. The computer system includes a memory, a memory controller and a cache. Responsive to determining to share a memory location among processes, the address of the memory may be aliased to another address within the same address space, with the address and aliased address assigned to respective ones of the processes. The memory controller manages the address space according to an aliasing region and a non-aliasing region, with addresses corresponding to the non-aliasing region being passed through to the memory. Addresses corresponding to the aliasing region are translated by the memory controller to match corresponding non-aliased memory addresses allowing aliased and non-aliased addresses to access same memory locations. A cache may cache accesses to memory addresses, including the non-aliased and aliased addresses, with different cache locations for selected according to the respective addresses of memory.

20 Claims, 9 Drawing Sheets

(56) References Cited

U.S. PATENT DOCUMENTS

| | | | |
|---|---|---|---|
| 10,311,229 B1 | 6/2019 | Pohlack | |
| 10,528,736 B1 | 7/2020 | Sobel | |
| 10,706,147 B1 | 7/2020 | Pohlack et al. | |
| 10,868,655 B2 | 12/2020 | Pohlack | |
| 2002/0069335 A1* | 6/2002 | Flylnn, Jr. | G06F 3/0683 711/152 |
| 2006/0026385 A1* | 2/2006 | Dinechin | G06F 12/1036 711/206 |
| 2007/0028072 A1* | 2/2007 | Hennessy | G06F 12/109 711/E12.068 |
| 2007/0180187 A1 | 8/2007 | Olson | |
| 2008/0109625 A1 | 5/2008 | Erlingsson | |
| 2011/0202728 A1 | 8/2011 | Nichols | |
| 2012/0137303 A1 | 5/2012 | Okada | |
| 2014/0059688 A1 | 2/2014 | Margalit | |
| 2014/0359778 A1 | 12/2014 | Kruglick | |
| 2015/0015913 A1 | 1/2015 | Tanba | |
| 2015/0370724 A1 | 12/2015 | Lutas | |
| 2016/0253259 A1 | 9/2016 | Jin | |
| 2016/0350244 A1 | 12/2016 | Tsirkin | |
| 2017/0004081 A1 | 1/2017 | Hayakawa | |
| 2017/0285976 A1* | 10/2017 | Durham | G06F 12/1408 |
| 2018/0203803 A1* | 7/2018 | Compton | G06F 9/52 |
| 2018/0341767 A1 | 11/2018 | Basak | |
| 2019/0324912 A1* | 10/2019 | Toivanen | G06F 12/084 |
| 2022/0214901 A1 | 7/2022 | Tsirkin | |

OTHER PUBLICATIONS

Hector Marco, et al., "AMD Bulldozer Linux ASLR weakness: Reducing entropy by 87.5%", Retrieved from http://hmarco.org/bugs/AMD-Bulldozer-linux-ASLR-weakness-reducing-mmaped-files-by-eight.html on Oct. 29, 2020, pp. 1-6.

Moinuddin K. Qureshi, "CEASER: Mitigating Conflict-Based Cache Attacks via Encrypted-Address and Remapping", In 2018 51st Annual IEEE/ACM International Symposium on Microarchitecture (MICRO), IEEE, 2018, pp. 775-787.

Zhenghong Wang, et al., "New Cache Designs for Thwarting Software Cache-based Side Channel Attacks", ISCA'07, ACM, Jun. 9-13, 2007, pp. 494-505.

Mario Werner, et al., "ScatterCache: Thwarting Cache Attacks via Cache Set Randomization", 28th USENIX Security Symposium, Aug. 14-16, 2019, Santa Clara, CA, pp. 1-19.

Yuval Yarom, et al., "FLUSH+RELOAD: a High Resolution, Low Noise, L3 Cache Side-Channel Attack," usenix, Proceedings of the 23rd USENIX Security Symposium, Aug. 2014, pp. 1-15.

Juerg Haefliger, "Add support for exclusive Page Frame Ownership(XPFO)," LWN.net, https://lwn.net/Articles/699116/, Jun. 23, 2021, pp. 1-2.

Joseph Bonneau and Ilya Mironov, "Cache-Collision Timing Attacks Against AES," CHES 2006, LNCS 4249, copyright International Association for Cryptologic Research 2006, pp. 201-215.

Red Hat Customer Portal, "OpenSSL Privilege Separation Analysis," Jun. 18, 2014, https://access.redhat.com/blogs/766093/posts/1976283, pp. 1-4.

U.S. Appl. No. 17/185,752, filed Feb. 25, 2021, Martin Pohlack, et al.

U.S. Appl. No. 17/491,252, filed Sep. 30, 2021, Martin Pohlack, et al.

M. Neagu, et al., "Protecting Cache Memories Through Data Scrambling Technique," 2014 IEEE 10th International Conference on Intelligent Computer Communication and Processing (ICCP), 2014, pp. 297-303.

M. Neagu, et al., "Interleaved Scrambling Technique: A Novel Low-Power Security Layer for Cache Memories," 2014 19th IEEE European Test Symposium (ETS), 2014, pp. 1-2.

M. Neagu et al., "Data Scrambling in Memories: A Security Measure," 2014 IEEE International Conference on Automation, Quality and Testing, Robotics, 2014, pp. 1-6.

Office Action from U.S. Appl. No. 17/203,600, filed Mar. 16, 2021, Pawel Wieczorkiewicz, et al., pp. 1-45.

* cited by examiner

DRAM Address = (Physical Address & Mask) ?
Physical Address & !(Mask|Select) | selector :
                Physical Address

MEMORY DE-DUPLICATION USING PHYSICAL MEMORY ALIASES

BACKGROUND

In various computing applications, opportunities exist where significant memory sharing between applications may be implemented. An example of such a computing application is in virtual computing, where computer virtualization may result in situations where many virtual machines (VMs, guests or compute instances) are similar to some extent. These virtual machines may run common code, use the same underlying disk image and so on. Thus, there may exist significant potential for sharing of physical memory to increase VM density, particularly in systems such as network-based virtualization services where VM density is inherently great, resulting in lower memory requirements in those computer systems.

Operating systems may support this sharing via shared libraries, buffer caches, and kernel-same-page merging. At the same time, however, there exist well-known security issues with shared memory making memory sharing between isolation boundaries problematic.

Figure 1:
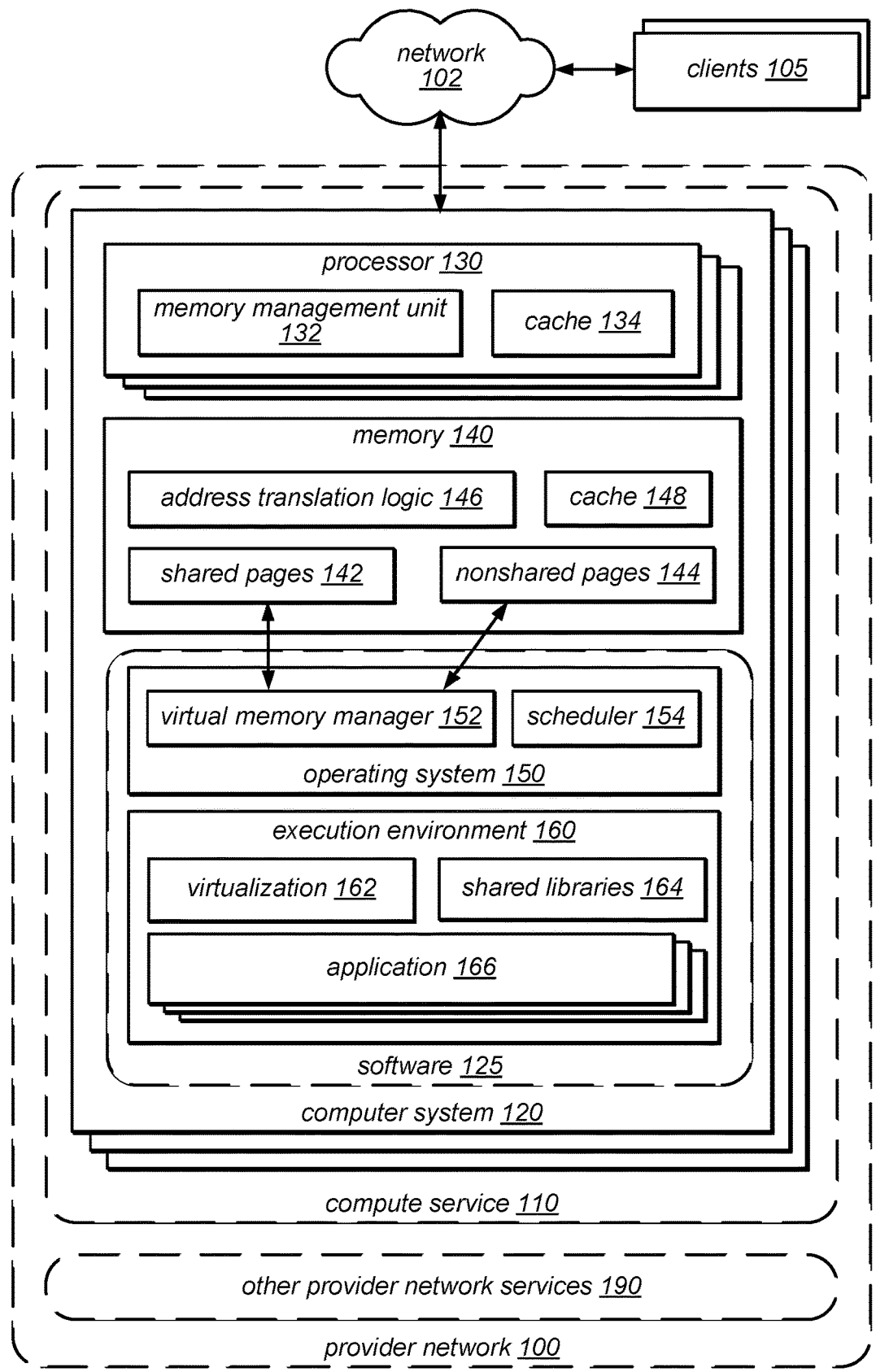
FIG. 1 is a block diagram of a system that implements safe sharing of memory pages using aliased physical memory, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

In various computing applications, opportunities exist where significant memory sharing between applications may be implemented. An example of such a computing application is in virtual computing, where computer virtualization may result in situations where many virtual machines (VMs, guests or compute instances) are similar to some extent. These virtual machines may run common code, use the same underlying disk image and so on. Thus, there may exist significant potential for sharing of physical memory to more efficiently utilize the shared hardware resources and to potentially increase VM density, particularly in systems such as network-based virtualization services, resulting in lower memory requirements in those computer systems.

Operating systems may support this sharing via shared libraries, buffer caches, and kernel-same-page merging. At the same time, however, there exist well-known security issues with sharing memory in multitenant systems, making memory sharing between isolation boundaries (e.g., accounts, network segments, virtual private clouds/networks) problematic. To address these security issues, various embodiments of systems implementing safe sharing of memory pages using aliased physical memory are disclosed.

These various embodiments may reduce the memory footprint of virtual machine processes by deduplicating, and marking as shared, virtual memory pages. Individual ones of the shared virtual memory pages may be assigned unique physical memory address ranges that are aliased to the same physical memory address range by an aliasing memory controller. In this way, various memory caches of the system will exhibit identical behaviors compared to systems not using shared memory pages, ensuring that sensitive information of one executable process cannot be leaked to other executable processes through cache analysis. These shared pages may be set to read-only to ensure that virtual memory used by different tenants in a multitenant environment are properly isolated, thus providing for safe sharing of memory pages. By reducing memory resources of standby virtual machines, overall memory consumption, a common limiting factor, of the hosting servers can be reduced.

A computer system including executable processes may analyze memory pages for opportunities to share memory pages. Memory pages of a particular process found to store contents matching that of memory pages mapped to other processes may be unmapped from the particular process and released for reuse by the computing device. To maintain the particular process in an executable state, deduplicated memory pages are marked as shared with similar memory pages mapped to the other processes and configured as read-only pages. Individual ones of the deduplicated memory pages are then allocated aliased versions of the memory addresses of the deduplicated memory pages and an aliasing memory controller is configured to translate the aliased memory addressed into non-aliased memory addresses of the deduplicated memory pages prior to accessing main memory. Various physical memory caches may cache memory accesses to the deduplicated memory pages, but as these caches operate on various aliased and non-aliased memory addresses which are different, the caches may allocated unique cache entries according to the respective addresses similar to the manner in which the physical memory caches operate with non-shared memory pages.

FIG. 1 is a block diagram of a system that implements safe sharing of memory pages using aliased physical memory addresses, according to some embodiments. A computer system 120, such as the computer system 2000 shown in further detail in FIG. 9 below, may implement safe sharing of memory pages, in some embodiments. This computer system may be a standalone computer system in some embodiments or may be one of a number of computer systems as part of a compute service 110 of a provider network 100 that provides a variety of network services including other network services 190, in other embodiments. In some embodiments, the computer system, as part of a compute service 110, may provide services to various clients 105 connected over a network 102. For example, compute service 110 may provide various computing resources, such as compute instances discussed below, or may provide "serverless" computing resources, such as event-driven computing resources that execute various tasks or operations responsive to requests or other events without provisioning or managing servers, creating scaling logic, or managing runtimes.

Provider network 100 may can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 100 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 100 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 100 may include the hardware (e.g., modems, routers, switches, load balancers, proxy servers, etc.) and software (e.g., protocol stacks, accounting software, firewall/security software, etc.) necessary to establish a networking links between different components of provider network 100, such as virtualization hosts, control plane components as well as external networks, such as network 102 (e.g., the Internet). In some embodiments, provider network 100 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 105 may be attached to the overlay network so that when a client 105 provides an IP address that they want to send packets to, the IP address is run in virtual space by communicating with a mapping service that knows where the IP overlay addresses are.

The computer system 120 may include one or more processors 130, with each processor including a cache subsystem 134 and a memory management unit 132 to support virtual memory services of software 125 including an operating system 150, in some embodiments. To provide these virtual memory services, the operating system 150 may include a virtual memory manager 152 which interacts with physical pages of a memory 140, the physical pages including shared pages 142 and nonshared pages 144, in some embodiments. Also included in the memory 140 is address translation logic 146 of an aliasing memory controller to support the safe sharing of physical memory and, in some embodiments, optional shared physical memory caches 148.

The caches 134 and 148 may include several cache tiers including at least one cache tier that caches physical memory addresses. A further discussion of the cache 134 may be found below in FIG. 8.

In some embodiments, various components of the memory 140 may be implemented as discrete system components. For example, the cache 148 may be implemented as a discrete hardware cache or be integrated partially or completely into a memory interface component of the processors 130, while the address translation logic 146 may be implemented in a discrete aliasing memory controller component that resides between the caches 134 and 148 and system memory where the shared pages 142 and nonshared pages 144 reside. In other embodiments, some or all of the various components of the memory 140 may be integrated. For example, the address translation logic 146, in some embodiments, may be incorporated into a DRAM controller for the memory 140 or may be incorporated into the system memory itself. Likewise, various caches 148 may also be incorporated into a DRAM controller for the memory 140 or may be incorporated into the system memory itself. These examples are not intended to be limiting and various implementations may be envisioned.

The computer system 120 may include software 125 including an operating system 150 to provide an execution environment 160 for respective processes of applications, in various embodiments. Included in the software 125 may be a virtual memory manager 152 to provide virtual memory services for the execution environment 160. The virtual memory manager 152 may then interact with physical pages of a memory 140 to support these virtual memory services, in some embodiments.

The execution environment 160 may include various elements that enable sharing of memory pages, such as virtualization software 162 and shared libraries 164. Other examples of elements that enable sharing of memory pages may be imagined and these examples shown in FIG. 1 are not intended to be limiting.

In some embodiments, virtualization software 162 may enable the creation of multiple virtual machines (VMs, guests or compute instances) which are similar to a great extent. These virtual machines may run common code, for example, and use similar or identical underlying disk images. Other similarities may exist and these examples are not intended to be limiting.

In some embodiments, these VMs may implement a virtual computing service, such as the compute service 110, that provides compute instances that execute tasks or applications for clients 105. In various embodiments, compute instance(s) may be implemented with a specified computational capacity (which may be specified by indicating the type and number of CPUs, the main memory size, and so on) and a specified software stack (e.g., a particular version of an operating system, which may in turn run on top of a hypervisor).

In some embodiments, compute instances may correspond to one of several instance families. An instance family may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance family can have a specific ratio of processing, local storage, memory, and networking resources, and different instance families may have differing types of these resources as well. Multiple sizes of these resource configurations can be available within a given instance family, referred to as "instance types." Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

Compute instances may operate or implement a variety of different frameworks, such as application server instances, general purpose or special-purpose operating systems, platforms that support various interpreted or compiled programming languages such as Ruby, Perl, Python, C, C++ and the like, or high-performance computing platforms) suitable for performing client applications, without, for example, requiring the client to access an instance. Applications (or other software operated/implemented by a virtual compute instance and may be specified by client(s), such as custom and/or off-the-shelf software.

In some embodiments, compute instances may have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires a compute instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

VMs implemented by virtualization software 162 may be configured similarly and have a significant virtual memory footprint that is duplicated across the VMs, and as at least some these VMs are kept in a ready-to-execute state, while not actively execution applications on behalf of clients, there may exist significant potential for sharing of physical memory pages among the VMs to increase VM density for the system.

Figure 2:
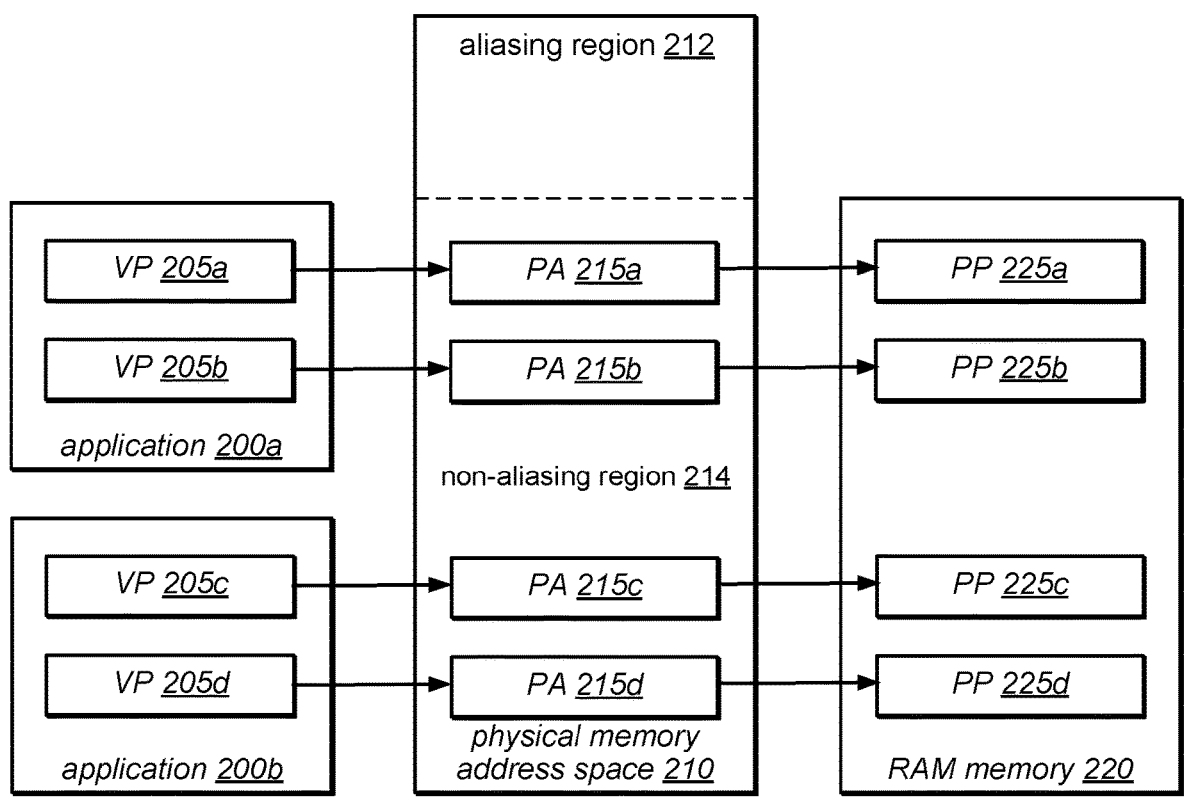
FIG. 2 is a block diagram illustrating portions of a memory system implements safe sharing of memory pages using aliased physical memory, according to some embodiments.

FIG. 2 is a block diagram illustrating portions of a memory system implements safe sharing of memory pages using aliased physical memory, according to some embodiments. Virtual memory addresses within virtual memory pages (VP) 205 of respective virtual memory address spaces of application(s) 200, such as applications 166 of FIG. 1, may map to physical memory addresses within various physical memory pages (PP) 225 in the RAM memory 220, such as the memory 140 of FIG. 1 through physical memory page addresses (PA) 215 of the physical memory space 210, in some embodiments. As shown in FIG. 2a, various virtual memory pages 205 may be allocated to non-shared physical memory pages 225, such as the nonshared pages 144 of FIG. 1. The physical memory space 210 may include aliasing region 212 and non-aliasing region 214. As no shared memory pages are used in FIG. 2a, no physical memory addresses are allocated in the aliasing region 212, while all physical memory addresses 215 are allocated in the non-aliasing region 214.

Figure 3:
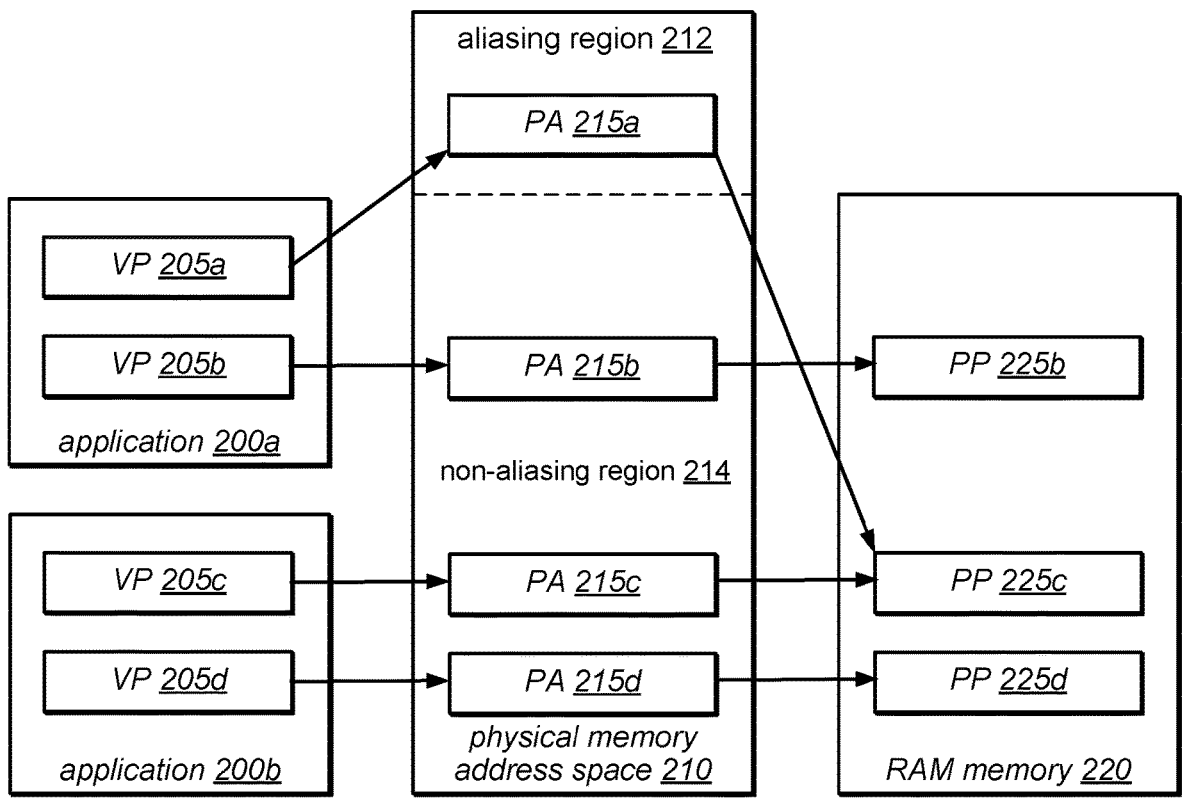
FIG. 3 is a block diagram illustrating portions of a memory system implements safe sharing of memory pages using aliased physical memory including a shared memory page, according to some embodiments.

FIG. 3 is a block diagram illustrating portions of a memory system implements safe sharing of memory pages using aliased physical memory including a shared memory page, according to some embodiments. Virtual memory addresses within virtual memory pages (VP) 205 of respective virtual memory address spaces of application(s) 200, such as applications 166 of FIG. 1, may map to physical memory addresses within various physical memory pages (PP) 225 in the RAM memory 220, such as the memory 140 of FIG. 1 through physical memory page addresses (PA) 215 of the physical memory space 210, in some embodiments.

As shown in FIG. 3, virtual memory pages 205b and 205d may be allocated to non-shared physical memory pages 225b and 225d, such as the nonshared pages 144 of FIG. 1 while virtual memory pages 205a and 205c may be allocated to shared physical memory pages 225c, such as the shared pages 146 of FIG. 1. The physical memory space 210 may include aliasing region 212 and non-aliasing region 214. To implement the shared memory page 225b, a physical memory address 215a may be allocated in the aliasing region 212 while physical memory address 215c may allocated in the non-aliasing region 214. These physical memory addresses 215a and 215c may then map to physical memory page 225c. In addition, non-shared physical memory pages 225b and 225d may be accessed by applications 200a and 200b through respective physical memory addresses 215b and 215d allocated in non-aliasing region 214. No RAM memory page 225 corresponding to page 225a of FIG. 2a is required, resulting in lower memory requirements for the computer system.

Figure 4:
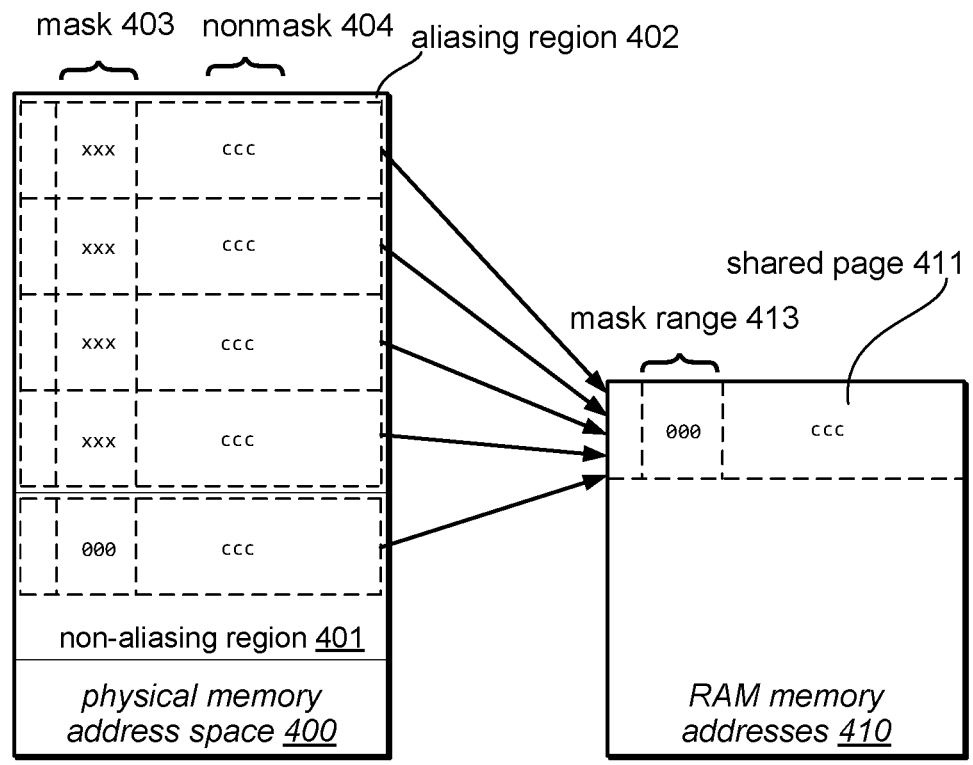
FIG. 4 is a block diagram illustrating aliasing of physical memory addresses, according to some embodiments.

FIG. 4 is a block diagram illustrating aliasing of physical memory addresses, according to some embodiments. A physical memory address space 400, such as the physical memory space 210 of FIGS. 2 and 3, may include a non-aliasing region 401 and aliasing region 402, such as the non-aliasing region 214 and aliasing region 212 of FIGS. 2 and 3, in some embodiments. Physical memory addresses, such as PA 215 of FIGS. 2 and 3, may include a mask region 403, where portions of physical memory addresses in the non-aliasing region 401 may contain a zero value in the mask region (denoted as '000') while portions of physical memory addresses in the aliasing region 402 may contain non-zero values (denoted as 'xxx') in the mask region. It should be noted that, while a mask range of 000 (a zero value) is shown for simplicity, a zero value is not required for physical memory addresses in the non-aliasing region and different, non-zero values may instead be used in various embodiments. These zero values are merely examples and are not intended to be limiting.

Portions of physical memory addresses in the aliasing region 402 outside the mask range, shown the nonmask range 404 and denoted as 'ccc', may determine the RAM address within the RAM memory address space 410 of the aliased physical memory address. These portions of physical memory addresses outside the mask range may be sufficiently large to encompass the entirety of the physical RAM of the system, such as the system memory 2020 as shown below in FIG. 9, and may include a sub-portion that defines a page size of memory pages supported by a virtual memory subsystem, such as formed by the virtual memory manager 152 and memory management unit 132 as shown in FIG. 1.

A translator module of a physical memory controller may determine the RAM address value of any aliased physical memory address, in some embodiments, by performing a logical AND operation on the physical memory address using the logical NOT of the mask range 313. All physical memory address with a nonmask range value of 'ccc', as shown in FIG. 4, will alias to the same RAM address, thereby resulting in a fixed number of alias-able physical addresses to non-aliased RAM addresses.

In some embodiments, the translator module may comprise address translation logic configured to ignore address bits within the mask range 403 and instead output address bits within the mask range corresponding the mask range value 413, thereby replacing address bits within the mask range 403 with a constant value, effectively aliasing various addresses within the aliasing region to a non-aliased RAM memory address.

Figure 5:
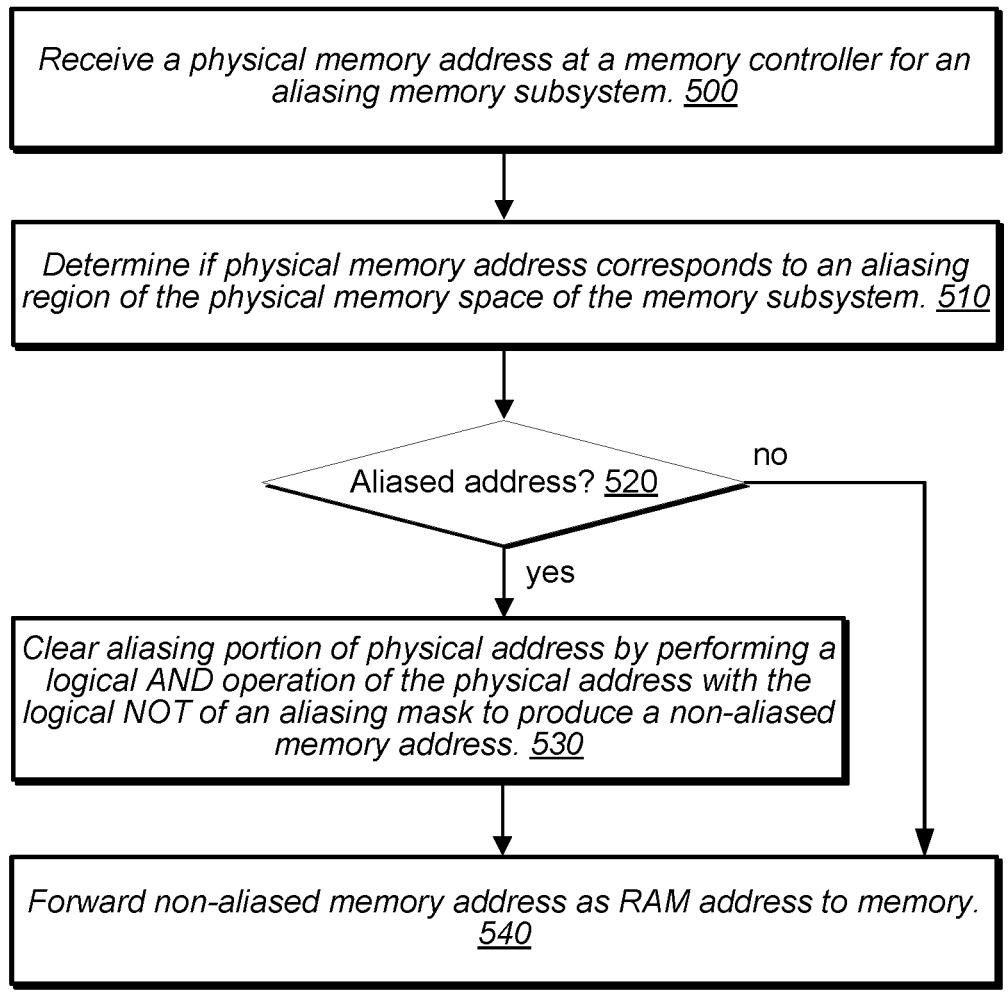
FIG. 5 is a flow diagram illustrating aliasing of physical memory addresses, according to some embodiments.

FIG. 5 is a flow diagram illustrating aliasing of physical memory addresses, according to some embodiments. The process begins at step 500, where a memory controller, such as the aliasing memory controller 146 of FIG. 1, may receive a physical memory address to access physical memory, such as memory 140 as shown in FIG. 1, in some embodiments.

The process may then proceed to step 510 where a hardware translator module of the memory controller may determine if the physical memory address corresponds to an aliasing region of the physical memory space, such as the aliasing region 212 as shown in FIGS. 2 and 3, of the memory subsystem, in some embodiments. This determination may be performed by examining an aliasing portion of the physical memory address such as by using the mask 403 as shown in FIG. 4, where a logical AND of the physical memory address with the mask 403 may result in a zero value indicating inclusion in a non-aliasing region such as the non-aliasing region 214 of FIGS. 2 and 3, and a non-zero value indicating inclusion in an aliasing region. This example, however, is not intended to be limiting and any number of determination techniques may be employed. It should also be noted that, in some embodiments, the determination steps 510 and 520 may be omitted, as the modification step 530 may be applied in some embodiments to physical memory addresses in both the aliasing region and non-aliasing region.

If the physical memory address corresponds to an aliasing region, as shown in a positive exit from 520, the process may proceed to step 530. If the physical memory address corresponds to a non-aliasing region, as shown in a negative exit from 520, the process may proceed to step 540. In this way, physical memory addresses within the non-aliasing region may directly map to matching RAM addresses of the system without translation.

As shown in step 530, a physical memory address in the aliasing region may be modified in some embodiments by performing a logical AND operation of the physical address and the logical NOT of a mask of the aliasing portion of the physical memory address, such as the mask 403 as shown in FIG. 4. This operation may, in some embodiments, result in a different, modified physical memory address with the aliasing portion of the address set to a non-aliasing value, such as is shown in the mask range value 413 of the shared page 411 as shown in FIG. 4. Once the non-aliased memory address is generated, the process may proceed to step 540.

As shown in 540, once a non-aliased memory address has been identified or generated, the non-aliased memory address may be forwarded as a RAM address to the memory for access.

Figure 6:
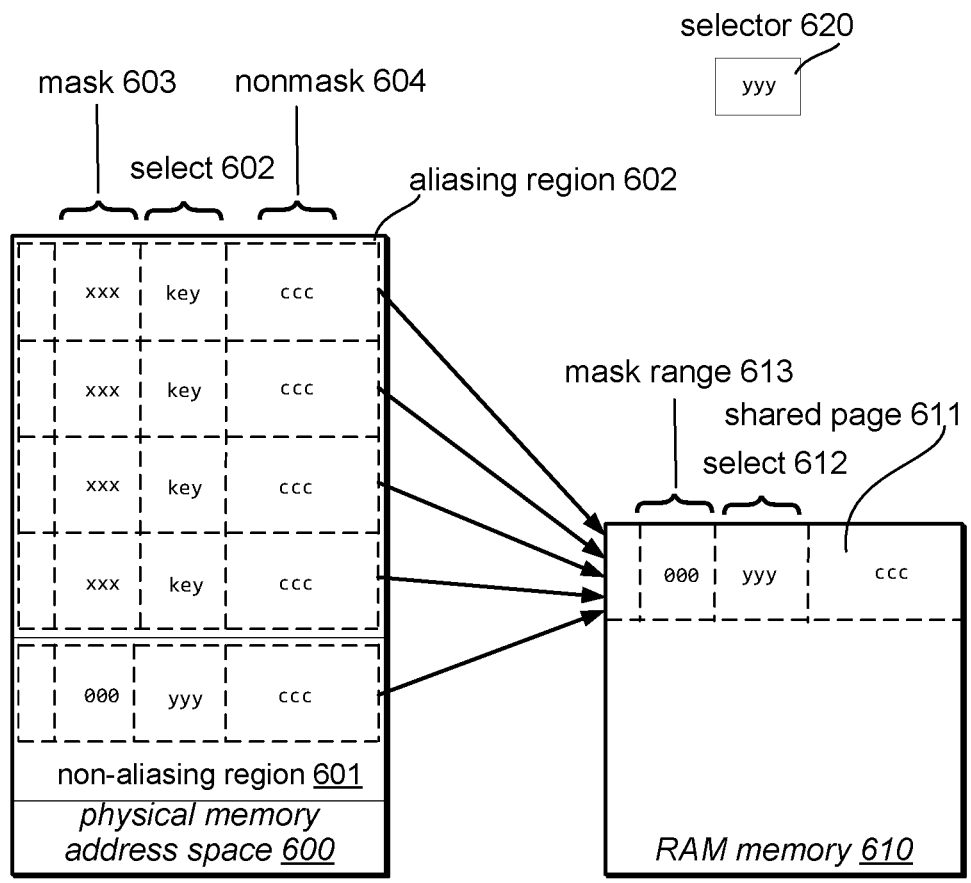
FIG. 6 is a block diagram illustrating aliasing of physical memory addresses using selectors, according to some embodiments.

In some embodiments, a variable number of alias-able physical addresses for various non-aliased RAM addresses may be provided. FIG. 6 extends the embodiments shown in FIG. 4 to include a selector portion of physical memory addresses to provide this capability. A physical memory space 600, such as the physical memory space 210 of FIGS. 2 and 3, may include a non-aliasing region 601 and aliasing region 502, such as the non-aliasing region 214 and aliasing region 212 of FIGS. 2 and 3, in some embodiments. Physical memory addresses, such as PA 215 of FIGS. 2 and 3, may include a mask region 603, where portions of physical memory addresses in the non-aliasing region 601 may contain a zero value in the mask region (denoted as '000') while portions of physical memory addresses in the aliasing region 602 may contain non-zero values (denoted as 'xxx') in the mask region.

Portions of physical memory addresses in the aliasing region 602 outside the mask range, shown the nonmask range 604 and denoted as 'ccc', may determine the RAM address of the aliased physical memory address. These portions of physical memory addresses outside the mask range may be sufficiently large to encompass the entirety of the physical RAM of the system, such as the system memory 2020 as shown below in FIG. 9, and may include a sub-portion that defines a page size of memory pages supported by a virtual memory subsystem, such as formed by the virtual memory manager 152 and memory management unit 132 as shown in FIG. 1.

A translator module of a physical memory controller may determine if a physical memory address is in the aliasing region or non-aliasing region of the physical memory space by analyzing a mask range using a mask 603. A portion of a memory address defined by the mask 603, denoted as 'xxx' in FIG. 6, may have a zero value or other reserved value indicating non-aliased memory or any other value indicating aliased memory.

For memory addresses within the aliasing region, a translator module of a physical memory controller may determine the RAM address value, in some embodiments, by extracting a key from a select 602 portion of the physical memory address and identifying a selector 620 in a lookup table, the lookup table maintained within the translator module and programmed by a virtual memory manager such as the virtual memory manager 152 as shown in FIG. 1. The translator module may mask off the aliasing region 613 and select region 612 by applying a logical AND operation using the memory address and the logical NOT if the combination of the mask 603 and select 602 values to generate an intermediate address value. The translator module may then add the selector 620 identified using the extracted key by performing a logical OR operation to the intermediate address value using the selector 620, thereby generating a RAM address value. It should be noted that various organizations of aliasing portions and select portions of physical addresses may be employed and various selector formats may be envisioned leading to a variety of computational embodiments of FIG. 6 and the implementation described about is merely one simplified example. Other examples of may be imagined and the example discussed in FIG. 6 is not intended to be limiting.

Figure 7:
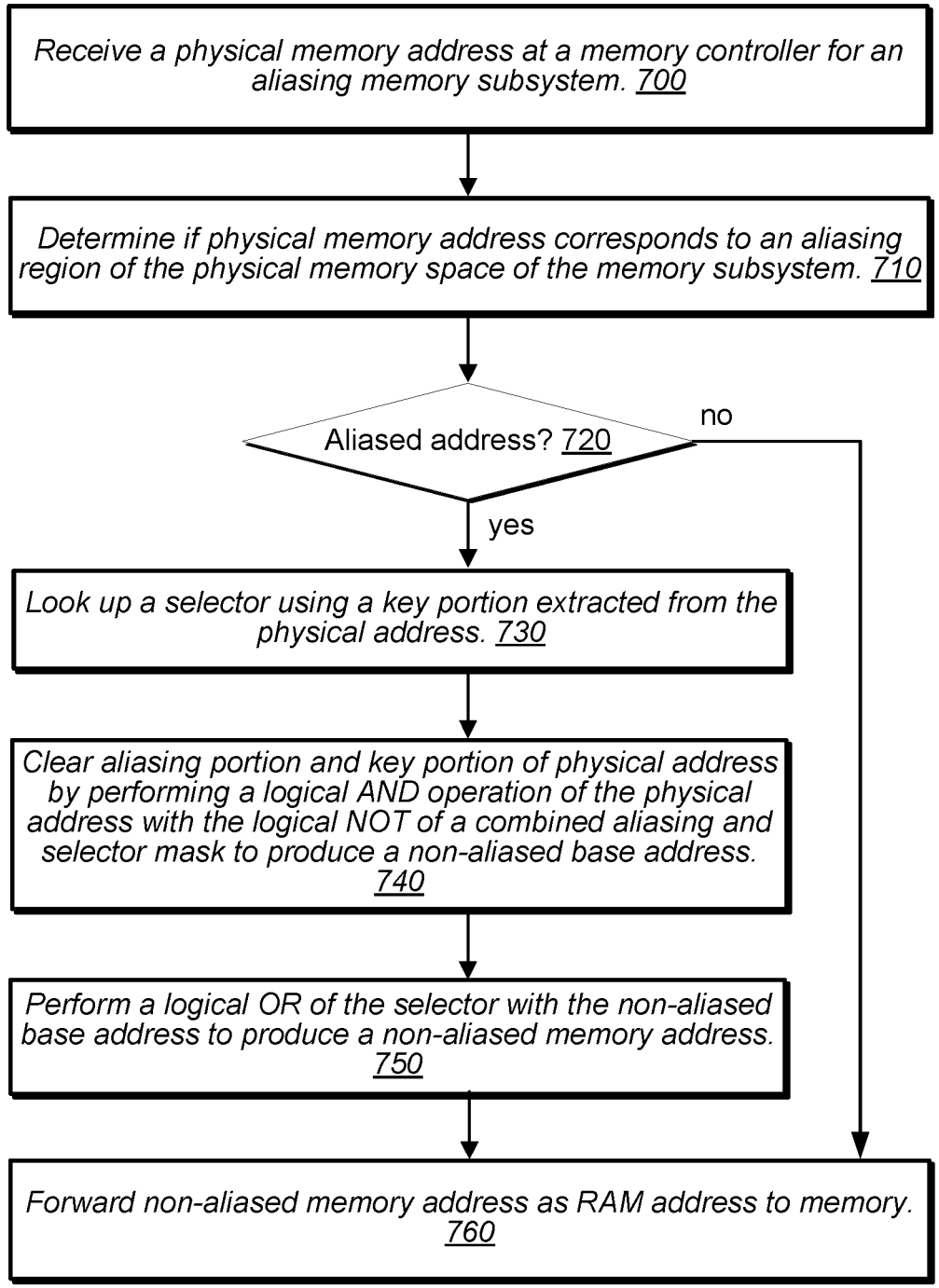
FIG. 7 is a flow diagram illustrating aliasing of physical memory addresses using selectors, according to some embodiments.

FIG. 7 is a flow diagram illustrating aliasing of physical memory addresses using selectors, according to some embodiments. The process begins at step 700, where a memory controller, such as the aliasing memory controller 146 of FIG. 1, may receive a physical memory address to access physical memory, such as memory 140 as shown in FIG. 1, in some embodiments.

The process may then proceed to step 710 where a hardware translator module of the memory controller may determine if the physical memory address corresponds to an aliasing region of the physical memory space, such as the aliasing region 212 as shown in FIGS. 2 and 3, of the memory subsystem, in some embodiments. This determination may be performed by examining an aliasing portion of the physical memory address such as by using the mask 403 as shown in FIG. 4, where a logical AND of the physical memory address with the mask 403 may result in a zero value indicating inclusion in a non-aliasing region such as the non-aliasing region 214 of FIGS. 2 and 3, and a non-zero value indicating inclusion in an aliasing region. This example, however, is not intended to be limiting and any number of determination techniques may be employed.

If the physical memory address corresponds to an aliasing region, as shown in a positive exit from 720, the process may proceed to step 730. If the physical memory address corresponds to a non-aliasing region, as shown in a negative exit from 720, the process may proceed to step 760. In this way, physical memory addresses within the non-aliasing region may directly map to matching RAM addresses of the system without translation.

As shown in step 730, the hardware translator may in some embodiments extract a key portion of the physical memory address, such as the key of the select address portion 602 as shown in FIG. 6, and use the extracted key to identify a selector, such as the selector 620 of FIG. 6, for the physical memory address. The key portion may be extracted in a variety of ways, including using a select mask, such as the select mask 602 of FIG. 6, in combination with various logical operations such as shift and AND operations. The selector may be stored within the hardware translator in any number of ways, such as within a lookup table or content addressable memory (CAM). These examples are not intended to be limiting and any number of methods may be employed to identify a selector for the aliased physical memory address.

The process may then proceed to step 740 where the physical memory address in the aliasing region may be modified in some embodiments by performing a logical AND operation of the physical address and the logical NOT of the combined key select and aliasing masks for the physical memory address, such as the mask 603 and select 602 as shown in FIG. 6. Then, as shown in 750, the selector identified in 730 may then be combined with the physical memory address, in some embodiments, to result in a different, modified physical memory address with the aliasing portion of the address set to a non-aliasing value, such as is shown in the mask range value 613 of the shared page 611, and the select range 612 set to the selector value 620, as shown in FIG. 6. Once the non-aliased memory address is generated, the process may proceed to step 760.

As shown in 760, once a non-aliased memory address has been identified or generated, the non-aliased memory address may be forwarded as a RAM address to the memory for access.

Figure 8:
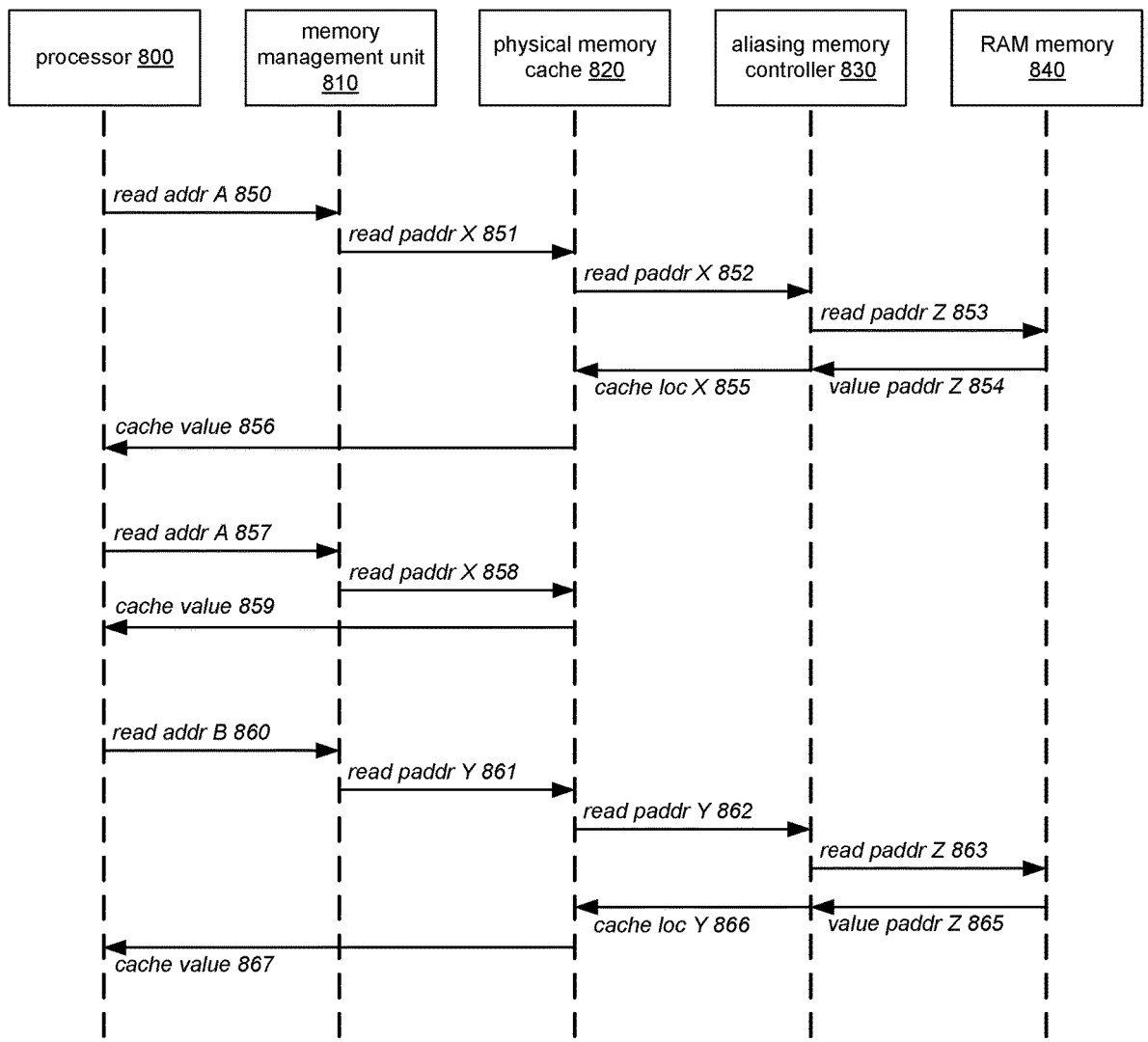
FIG. 8 is a block diagram illustrating caching of physical memory address including aliased physical memory addresses, according to some embodiments.

FIG. 8 is a block diagram illustrating caching of physical memory address including aliased physical memory addresses, according to some embodiments. A processor 800, such as the processor 130 of FIG. 1, may execute a first process, such as application 166 of FIG. 1, that accesses memory as shown as read address A 850, in some embodiments. This read request is sent to a memory management unit 810, such as the memory management unit 132 of FIG. 1, where the virtual address (read addr A) may be converted to a physical address X 851, in some embodiments. This physical address may then be submitted to a physical memory cache 820, such as the cache 134 of FIG. 1, where the cache may determine a cache location X according to the physical address X where a value for physical address X may be stored, in some embodiments. The physical memory cache may then submit a read request for physical address X 852 to aliasing memory controller 830, such as the aliasing memory controller 146 of FIG. 1. The aliasing memory controller may then determine that the physical address X is contained within a non-aliasing region of a physical address space such as by using techniques discussed above in FIGS. 3-7, in some embodiments. The aliasing memory controller may then pass through, or directly map, the physical address X to a read of physical RAM memory 853.

Responsive to receiving a read request for physical address Z 853, the RAM memory may then, in some embodiments, return a value for physical address Z 854. This value may then be written into a location within the physical memory cache 855, the location determined according to the physical address X. The physical memory cache may then return the memory value or cache value to the processor 856.

The processor 800, such as the processor 130 of FIG. 1, may then execute another access to the same memory address as shown as read address A 857, in some embodiments. This read request is then sent to the memory management unit 810, such as the memory management unit 132 of FIG. 1, where the virtual address (read addr A) may be converted to a physical address X 858, in some embodiments. This physical address may then be submitted to a physical memory cache 820, such as the cache 134 of FIG. 1, where the cache may again determine the cache location X according to the physical address X where a value for physical address X is stored, in some embodiments. As a value for physical address X is stored in the determined cache location X, the physical memory cache may then return the cached value to the processor 859.

The processor 800, such as the processor 130 of FIG. 1, may then execute a second process, such as application 166 of FIG. 1, that accesses memory as shown as read address 860, in some embodiments. This read request is sent to a memory management unit 810, such as the memory management unit 132 of FIG. 1, where the virtual address (read addr B) may be converted to a physical address Y 861, in some embodiments. This physical address may then be submitted to a physical memory cache 820, such as the cache 134 of FIG. 1, where the cache may determine a cache location Y according to the physical address Y where a value for physical address Y may be stored, in some embodiments. The physical memory cache may then submit a read request for physical address Y 862 to aliasing memory controller 830, such as the aliasing memory controller 146 of FIG. 1. The aliasing memory controller may then determine that the physical address Y is contained within an aliasing region of a physical address space such as by using techniques discussed above in FIGS. 3-7, in some embodiments. The aliasing memory controller may then translate the aliased physical address Y, using techniques discussed above in FIGS. 3-7, into non-aliased the physical address X and submit a read of physical RAM memory 853.

Responsive to receiving a read request for physical address Z 863, the RAM memory may then, in some embodiments, return a value for physical address Z 865. This value may then be written into a location within the physical memory cache 866, the location determined according to the physical address Y. The physical memory cache may then return the memory value or cache value to the processor 867.

Figure 9:
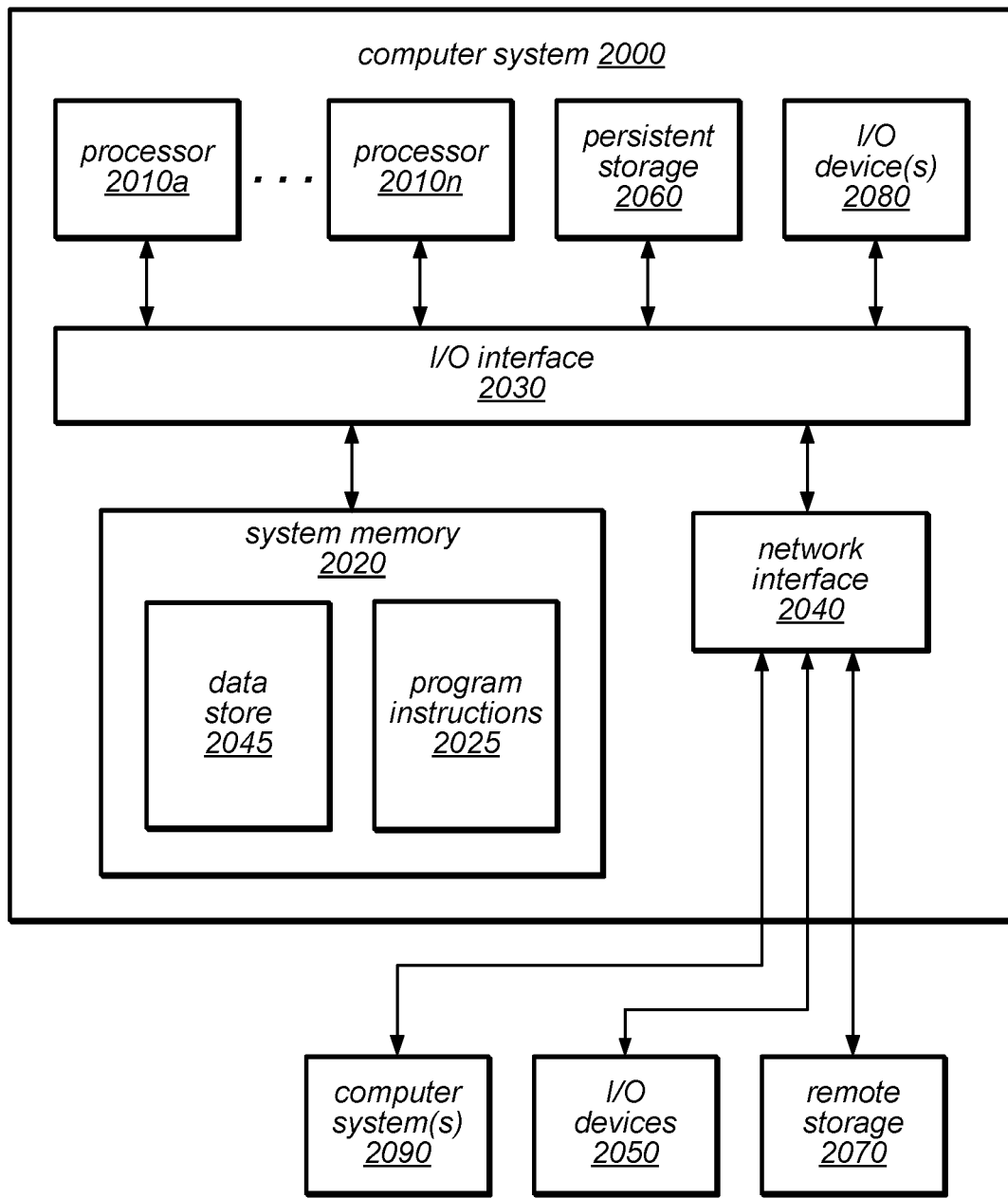
FIG. 9 is a block diagram illustrating an example computer system, according to various embodiments.

Various ones of the illustrated embodiments may include one or more computer systems 2000 such as that illustrated in FIG. 9 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 9 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A memory subsystem, comprising:
 a memory controller, configured to:
  directly map a first memory address of a non-aliasing region of an address space to a physical address of a memory, wherein the first memory address and the physical address are matching; and alias the physical memory location of the memory to a second memory address of an aliasing region of the address space, wherein to alias the physical memory location the memory controller is configured to translate, by address translation logic for the aliasing region, the second memory address of the aliasing region of the address space to the physical address of the memory, wherein the second memory address and the physical address are different;

a cache, configured to:

cache an access to the physical address using the first memory address in a first cache location according to the first memory address; and cache an access to the physical address using the second memory address in a second cache location according to the second memory address, wherein the first cache location and the second cache location are different.

2. The memory subsystem of claim 1, wherein the address space comprises a plurality of pages determined according to a page size, wherein to translate the second memory address, the memory controller is configured to translate a portion of the second memory address to generate a translated second memory address that matches the first memory address, the portion excluding a page offset portion of the second memory address.

3. The memory subsystem of claim 1, wherein a physical memory location identified by the physical address of memory contains data identified as sensitive to side-channel attacks, and wherein the translating and caching ensure isolation of executable processes respectively assigned the first memory address and the second memory address to mitigate threats of the side-channel attacks.

4. The memory subsystem of claim 1, wherein the cache is configured to receive physical memory addresses.

5. A method, comprising:

determining to share a physical memory location between a first executable process and a second executable process, and responsive to the determining:

aliasing the physical memory location, addressed using a first memory address of a non-aliasing region of an address space, to a second memory address of an aliasing region of the address space, wherein the first memory address and the second memory address are different memory addresses of the address space;

translating, by a hardware address translator for the aliasing region, a portion of the second memory address to generate a translated second memory address that matches the first memory address; and assigning the first memory address to the first executable process and the second memory address to the second executable process.

6. The method of claim 5, further comprising:

caching respective accesses to the physical memory location by the first executable process and the second executable process, wherein an access to the physical memory location by the first executable process is stored in a first cache location according to the first memory address, wherein an access to the physical memory location by the second executable process is stored in a second cache location according to the second memory address, and wherein the first cache location and the second cache location are different.

7. The method of claim 6, wherein the caching is performed by physical memory cache that caches values of physical memory addresses.

8. The method of claim 5, further comprising configuring the physical memory location as a read-only memory location responsive to the determining.

9. The method of claim 5, wherein the non-aliasing region and the aliasing region each comprising a plurality of memory addresses of the address space.

10. The method of claim 9, wherein the address space comprises a plurality of pages determined according to a page size, wherein the portion of the second memory address translated by the hardware address translator for the aliasing region excludes a page offset portion of the second memory address.

11. The method of claim 5, wherein the physical memory location contains data identified as sensitive to side-channel attacks, and wherein the aliasing and assigning ensure isolation of the first executable process and the second executable process to mitigate threats of the side-channel attacks.

12. The method of claim 5, wherein the first executable process and the second executable process implement respective virtual machines maintained in an executable state as part of a computing service of a provider network.

13. A system, comprising:

one or more processors, a memory, and address translation logic;

the one or more processors configured to:

determine to share a physical memory location between a first executable process and a second executable process, and responsive to the determining:

configure the memory controller to alias the physical memory location, addressed using a first memory address of an address space, to a second memory address of the address space, wherein the first memory address and the second memory address are different memory addresses of the address space; and assign the first memory address to the first executable process and the second memory address to the second executable process; and the address translation logic configured to:

translate a portion of the second memory address to generate a translated second memory address that matches the first memory address.

14. The system of claim 13, further comprising:

a cache, configured to:

cache respective accesses to the physical memory location by the first executable process and the second executable process, wherein an access to the physical memory location by the first executable process is stored in a first cache location according to the first memory address, wherein an access to the physical memory location by the second executable process is stored in a second cache location according to the second memory address, and wherein the first cache location and the second cache location are different.

15. The system of claim 14, wherein the cache is configured to receive physical memory addresses comprising a portion of aliasing address bits, wherein the cache is configured to send the physical memory addresses to the address translation logic, and wherein the address translation logic is configured to ignore the portion of aliasing address bits received from the cache.

16. The system of claim 14, wherein the cache and the address translation logic are incorporated into the memory.

17. The system of claim 14, wherein the address translation logic is external to the memory.

18. The system of claim 13:
   wherein the address space comprises a non-aliasing region and an aliasing region, the non-aliasing region and the aliasing region each comprising a plurality of memory addresses of the address space; and
   wherein the non-aliasing region comprises the first memory address and the aliasing region comprises the second memory address.

19. The system of claim 13, wherein the physical memory location contains data identified as sensitive to side-channel attacks, and wherein the configuring, assigned and translating ensure isolation of the first executable process and the second executable process to mitigate threats of the side-channel attacks.

20. The system of claim 13, wherein the first executable process and the second executable process implement respective virtual machines maintained in an executable state as part of a computing service of a provider network.

* * * * *